United States Patent
Nussbaum et al.

(10) Patent No.: US 9,937,942 B2
(45) Date of Patent: Apr. 10, 2018

(54) CART AND DOLLY HANDLE WITH HINGED MIDDLE BEAM

(71) Applicant: ORBIS Corporation, Oconomowoc, WI (US)

(72) Inventors: Robert Guy Nussbaum, Oconomowoc, WI (US); Benjamin Joel Thompson, Johnson Creek, WI (US); Stephen Roland Howe, Cottage Grove, WI (US)

(73) Assignee: ORBIS Corporation, Oconomowoc, WI (US)

( * ) Notice: Subject to any disclaimer, the term of this patent is extended or adjusted under 35 U.S.C. 154(b) by 0 days.

(21) Appl. No.: 15/376,070

(22) Filed: Dec. 12, 2016

(65) Prior Publication Data

US 2017/0190343 A1      Jul. 6, 2017

Related U.S. Application Data

(60) Provisional application No. 62/273,829, filed on Dec. 31, 2015, provisional application No. 62/273,061, filed on Dec. 30, 2015.

(51) Int. Cl.
*B62B 3/02* (2006.01)
*B62B 5/06* (2006.01)

(52) U.S. Cl.
CPC . *B62B 3/02* (2013.01); *B62B 5/06* (2013.01)

(58) Field of Classification Search
CPC .. B62B 3/02; B62B 3/007; B62B 5/06; B62B 5/061; B62B 5/067
USPC .............................. 280/47.34, 47.36, 47.371
See application file for complete search history.

(56) References Cited

U.S. PATENT DOCUMENTS

| 2,706,643 | A | * | 4/1955 | Babcock | B62B 5/06 |
| | | | | | 16/438 |
| 4,272,100 | A | * | 6/1981 | Kassai | B62B 7/08 |
| | | | | | 280/47.4 |
| 5,299,816 | A | | 4/1994 | Vom Braucke et al. | |
| 5,538,267 | A | | 7/1996 | Pasin et al. | |

(Continued)

FOREIGN PATENT DOCUMENTS

| CN | 2246607 Y | 2/1997 |
| DE | 3917279 A1 | 11/1990 |

(Continued)

OTHER PUBLICATIONS

Russian Federal Institute of Industrial Property, International Search Report and Written Opinion of International Searching Authority for International Application No. PCT/US2016/066297, dated Mar. 16, 2017 (7 pages).

(Continued)

*Primary Examiner* — John D Walters
(74) *Attorney, Agent, or Firm* — Greensfelder, Hemker & Gale, P.C.

(57) ABSTRACT

A transport structure, such as a cart or dolly having a handle structure that can be inserted laterally into an opening in the transport structure is provided. The handle structure includes a first connection hook portion and a second connection hook portion moveable from a first spaced position to a second spaced position greater than the first spaced position. The handle structure includes a hinged beam that enables the hook portions to contract and expand from the first position to the second position.

20 Claims, 8 Drawing Sheets

(56) References Cited

U.S. PATENT DOCUMENTS

| | | | |
|---|---|---|---|
| 6,042,376 A | | 3/2000 | Cohen et al. |
| 6,224,072 B1* | | 5/2001 | Weck ................ B62B 3/02 |
| | | | 211/204 |
| 6,499,750 B1* | | 12/2002 | Michelau .......... B62B 3/007 |
| | | | 280/47.34 |
| 7,462,009 B2* | | 12/2008 | Hartmann ......... B62B 5/049 |
| | | | 280/47.371 |
| 9,561,815 B2* | | 2/2017 | Choi ................ B62B 5/06 |

FOREIGN PATENT DOCUMENTS

| | | |
|---|---|---|
| GB | 2334007 A | 8/1999 |
| SU | 1588619 A1 | 8/1990 |
| WO | 2014120022 A1 | 8/2014 |

OTHER PUBLICATIONS

Russian Federal Institute of Industrial Property, International Search Report and Written Opinion of International Searching Authority for International Application No. PCT/US2016/066312, dated Apr. 20, 2017 (6 pages).

* cited by examiner

CART AND DOLLY HANDLE WITH HINGED MIDDLE BEAM

CROSS-REFERENCE TO RELATED APPLICATIONS

The present invention claims the benefit of U.S. Provisional Patent Application Nos. 62/273,829, filed Dec. 31, 2015, and 62/273,061, filed Dec. 30, 2015, the contents of which are incorporated herein by reference.

FEDERALLY SPONSORED RESEARCH OR DEVELOPMENT

N/A

FIELD OF THE INVENTION

The present invention generally relates to a cart or dolly having a detachable handle with a hinged middle beam.

BACKGROUND OF THE INVENTION

Carts, dollies and other similar structures are used for transporting goods or other articles, typically held in containers. Typically, a detachable handle is used to move the cart or dolly. The handles tend to be rigid structures with no moving parts, and have a range of movement that allows for two working positions—pushing and pulling—and a resting position (which is usually the same as the pulling position). The handles are removed during storage or transport of the cart or dolly in a truck or other similar transport vehicle or container. The handles are typically shipped separately.

The present invention provides an improved cart or dolly with a handle with a hinged middle beam to facilitate engagement with the cart or dolly.

SUMMARY OF THE INVENTION

The present invention provides a transport structure, such as a dolly or cart having a handle structure that can be connected by moving laterally into an opening on the transport structure. The handle uses a hinged middle beam that allows a bottom portion of the handle structure to contract and expand. This contraction and expansion allows for connecting structure in the handle structure to engage perpendicular wall faces in the opening. In contrast a rigid handle structure would have to enter the transport structure from the top or bottom—which isn't always possible (e.g., when a load is present on the transport structure).

In accordance with one aspect of the invention, a transport structure with a removable handle is provided. The transport structure comprises a platform having a generally planar upper surface for supporting loads and a plurality of wheels connected to a lower surface. The platform has an opening on a side of the platform for connecting to a handle. A handle having a first hook portion and a second hook portion is provided for connecting the handle to the platform through the opening. The first hook portion and second hook portion are moveable from a first contracted position to a second expanded position.

The transport structure can be a dolly. Alternatively, the transport structure can be a cart or other similar structures.

The handle can include a first bar connected to the first hook portion and a second bar connected to the second hook portion. The first and second bars extend from the hook portions to a hand clasp at a top portion of the handle.

The handle also includes a hinged middle beam connecting a middle portion of the first bar to a middle portion of the second bar. The hinged middle beam is moveable from a first unhinged, contracted state or configuration to a hinged, expanded state or configuration. The expansion and contraction of the hinged middle beam, in turn, moves the first and second hook portions from a first spaced relationship (i.e., when contracted) to a second spaced relationship greater than the first spaced relationship (i.e., when expanded). This movement allows the hooked portions to be inserted or removed from the opening when in the first spaced relationship, and locked into the opening when in the second spaced relationship.

The first hook portion can include a first locking pin configured to engage a first side of the opening and the second hook portion can include a second locking pin configured to engage a second side of the opening. Alternatively, the first side of the opening includes a first locking pin configured to engage the first hook portion and a second side of the opening includes a second locking pin configured to engage the second hook portion.

Alternatively, instead of a hinged member, the first hook portion can be separated from the second hook portion by a biasing mechanism, such as a spring.

The handle can be formed from metal, plastic or other suitable material. The platform can be formed from a molded plastic or other suitable material.

In accordance with another aspect of the invention, a dolly with a removable handle is provided. The dolly comprises a generally rectangular platform having an upper support surface. The platform has a first side, a second side opposing the first side, a first end and a second end opposing the first end, and a plurality of wheels connected to a lower portion of the platform. A handle structure is detachably connectable to the platform. The handle structure has a first hook portion for connecting to the platform and a second hook portion for connecting to the platform. The first hook portion is moveable from a first position spaced from the second hook portion a first distance to a second position spaced from the second hook portion a second distance greater than the first distance.

The platform includes an opening along the first side for receiving the first hook portion and the second hook portion. The opening requires lateral movement of the hook portions when the dolly is in a normal upright position.

The handle structure can include a first bar connected to the first hook portion and a second bar connected to the second hook portion. Additionally, the handle structure includes a hinged beam connected to the first bar and the second bar. The hinged beam is preferably connected to a middle portion of the first bar and the second bar.

Again, alternatively, the handle structure can includes a biasing mechanism connected to the first bar and the second bar for managing the spaced relationship between the hooked portions.

Further aspects of the invention are disclosed in the Figures, and are described herein.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there is shown in the drawings, and will herein be described in detail preferred embodiments of the invention with the understanding that the present disclosure is to be considered as an exemplification of the principles of the invention and is not intended to limit the broad aspect of the invention to the embodiments illustrated.

The present invention is directed to transport structures, such as carts or dollies and other similar structures, and to detachable handles for pushing or pulling the transport structures. The carts or dollies are typically formed from a molded plastic, or other suitable materials.

Prior to the present invention, handles for moving a cart or dolly were only able to engage the cart or dolly in a single position (i.e., extending upward and outward from an edge of the cart or dolly). After pushing or pulling the cart or dolly to the desired location, the handle was then removed from the cart or dolly. The handles had to be separately stored or transported for later use with the cart or dolly. These prior handles were typically formed from a single piece of rigid plastic. Accordingly, the handles typically had to be connected to the cart or dolly through openings in the top or bottom of the cart or dolly. This sometimes posed problems when a load on the cart or dolly interfered with placement or removal of the handle.

Figure 1:
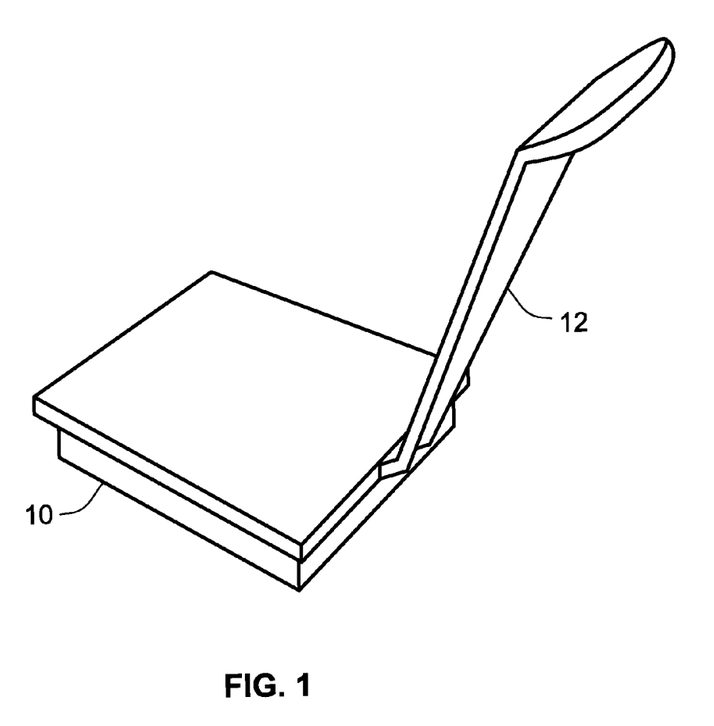
FIG. 1 is a perspective view of one known dolly and handle with the handle inserted in the dolly for use.
Figure 2:
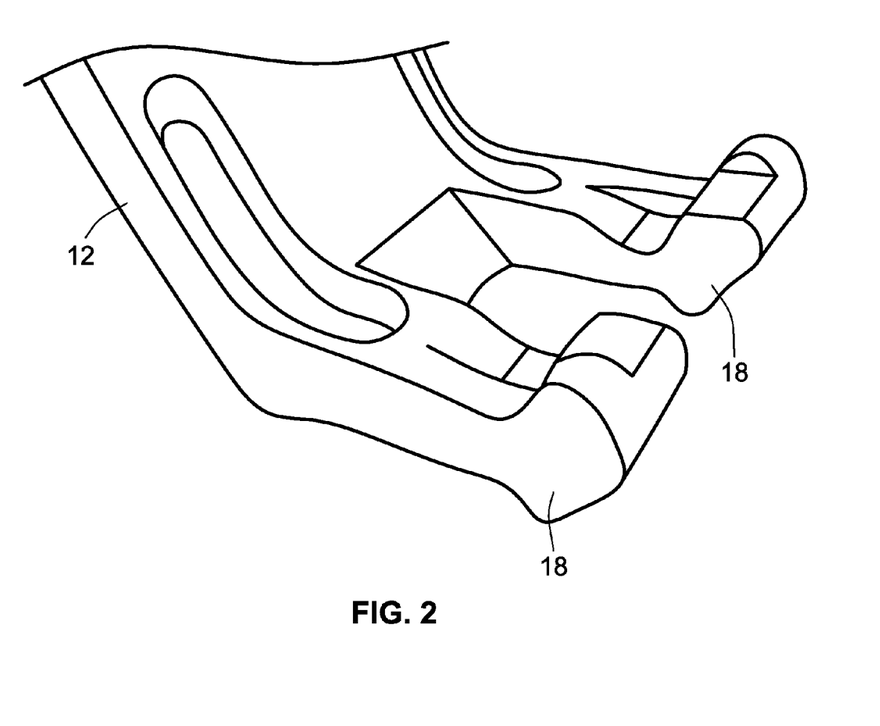
FIG. 2 is a perspective view of a lower portion of the handle of FIG. 1 removed from the dolly.
Figure 3:
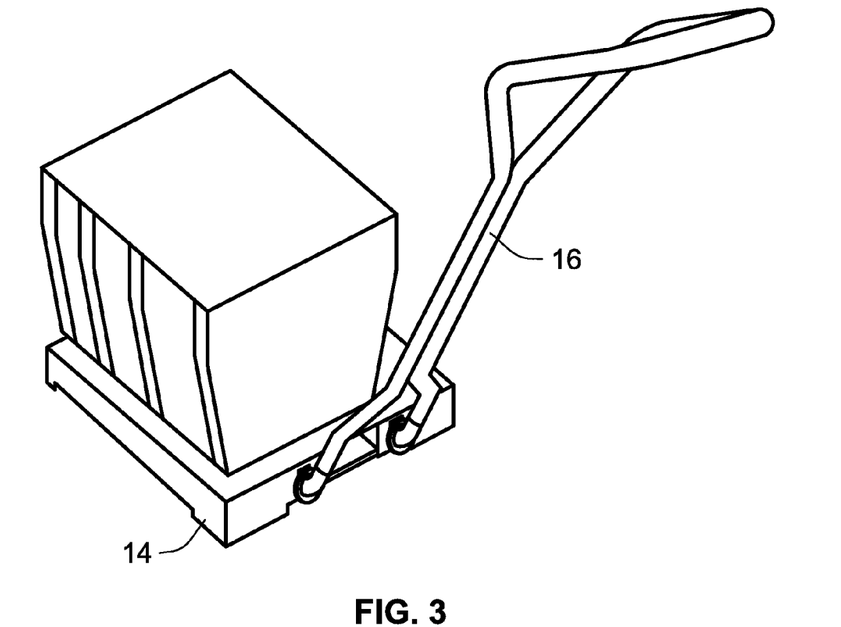
FIG. 3 is a perspective view of another known dolly and handle with the handle inserted into the dolly for use.
Figure 4:
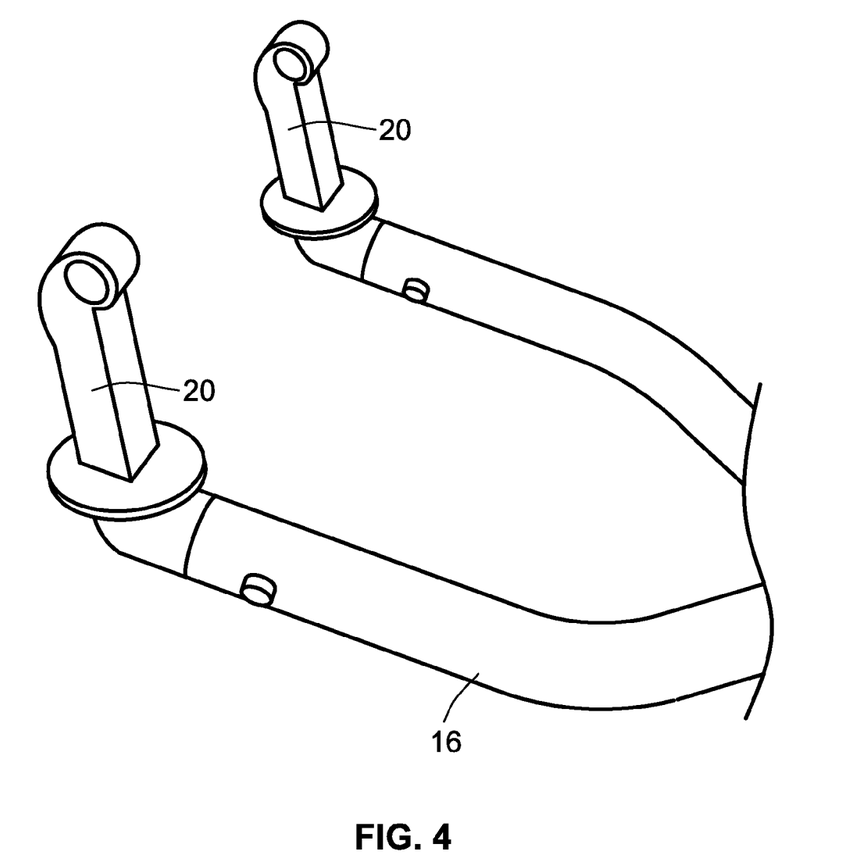
FIG. 4 is a perspective view of a lower portion of the handle of FIG. 3 removed from the dolly.

FIGS. 1 and 2 disclose a first known dolly 10 and handle 12 combination or system. FIGS. 3 and 4 disclose a second similar known dolly 14 and handle 16 combination or system. Both handles 12, 16 are formed from a single piece of rigid plastic.

As shown in FIG. 2, the bottom end of the handle 12 included hook-like features 18. These hook-like features 18 were inserted into corresponding structure in the dolly to enable pushing or pulling of the dolly by the handle 12. The handle 16 of the second known system has similar hook-like features 20. Because the hook-like features 18, 20 are formed from a rigid plastic and could not move relative to each other, they need to be inserted into the dolly 10, 14 from an opening or slot in the top or bottom of the dolly in order to engage structure that would allow one to push or pull the transport structure with the handle.

Figure 5:
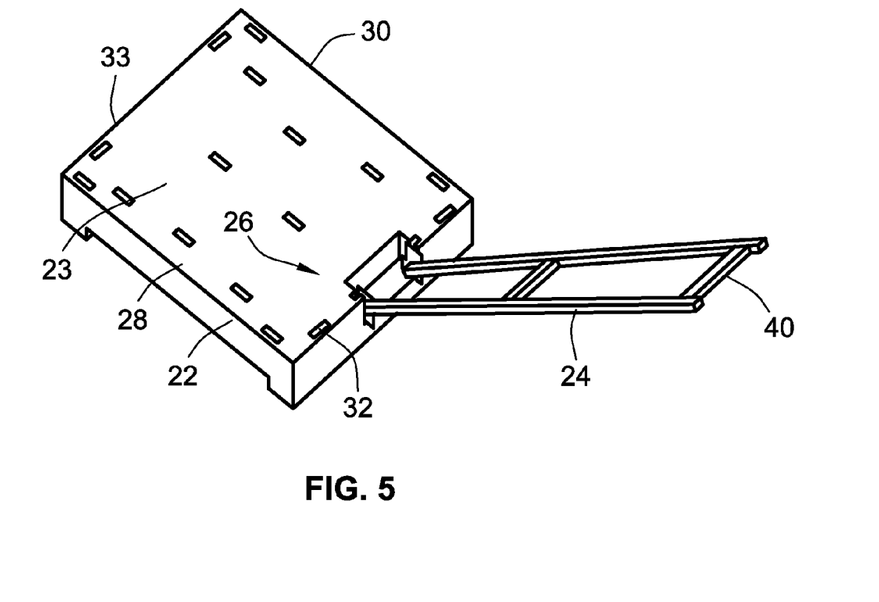
FIG. 5 is a perspective view of a dolly and handle with a hinged middle beam in accordance with the present invention with the present invention.

FIG. 5 shows a dolly 22 having a handle 24 made in accordance with the present invention. The dolly 22 includes a generally rectangular platform having an upper surface 26. The platform extends from a first side 28 to a second side 30 and from a first end 32 to a second end 33. A plurality of wheels is connected to the lower portion of the platform (typically, one wheel in each of the corner regions).

The handle 24 includes a first bar 34 extending lengthwise through the handle structure, and a second bar 36 extending lengthwise through the handle structure separated from the first bar 34 by a hinged middle beam 38 and a top hand clasp portion 40. The handle 24 also includes a first hook portion 42 connected to a bottom end of the first bar 34 and a second hook portion 44 connected to a bottom end of the second bar 36. The hook portions 42, 44 extend outward at an angle from the first and second bars 34, 36.

Figure 6:
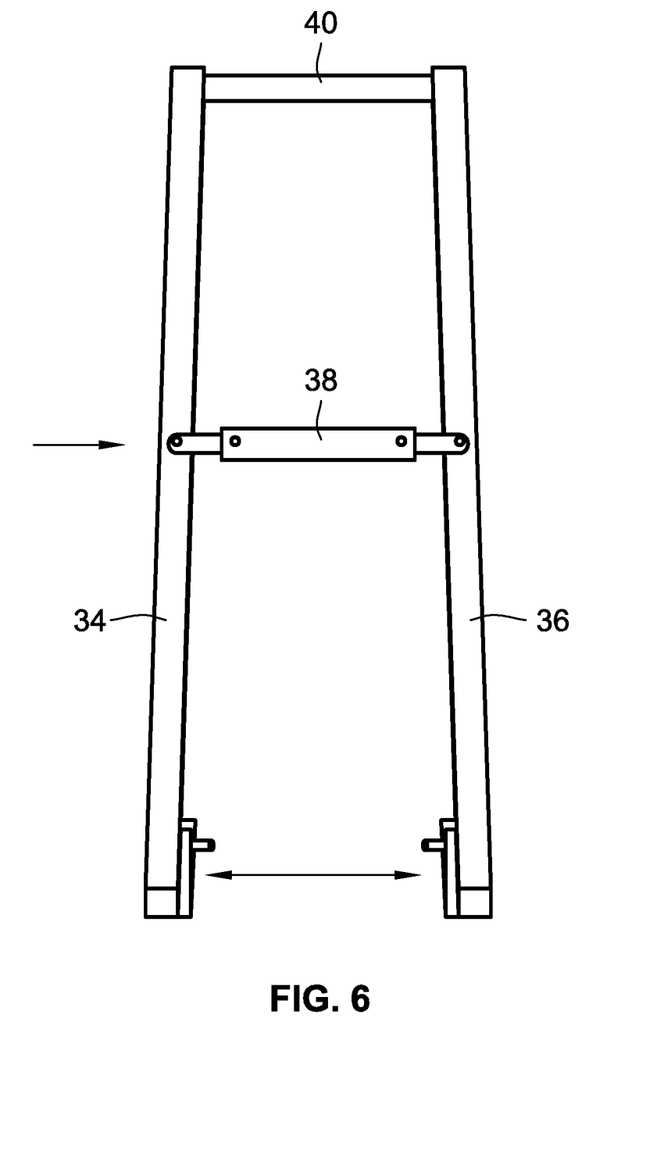
FIG. 6 is a plan view of only the handle of FIG. 5 with the handle being in an expanded state or configuration; and, FIG. 7 is a plan view of only the handle of FIG. 5 with the handle being in an contracted state or configuration.

As illustrated in FIG. 6, the handle 24 is shown in an expanded state with the hinged beam 38 in a locked, closed configuration. The first and second bars 34, 36 are substantially parallel to each other in this configuration. The hook portions 42, 44 are separated a distance equal to the hinged beam 38 and the hand clasp portion 40 in this configuration.

Figure 7:
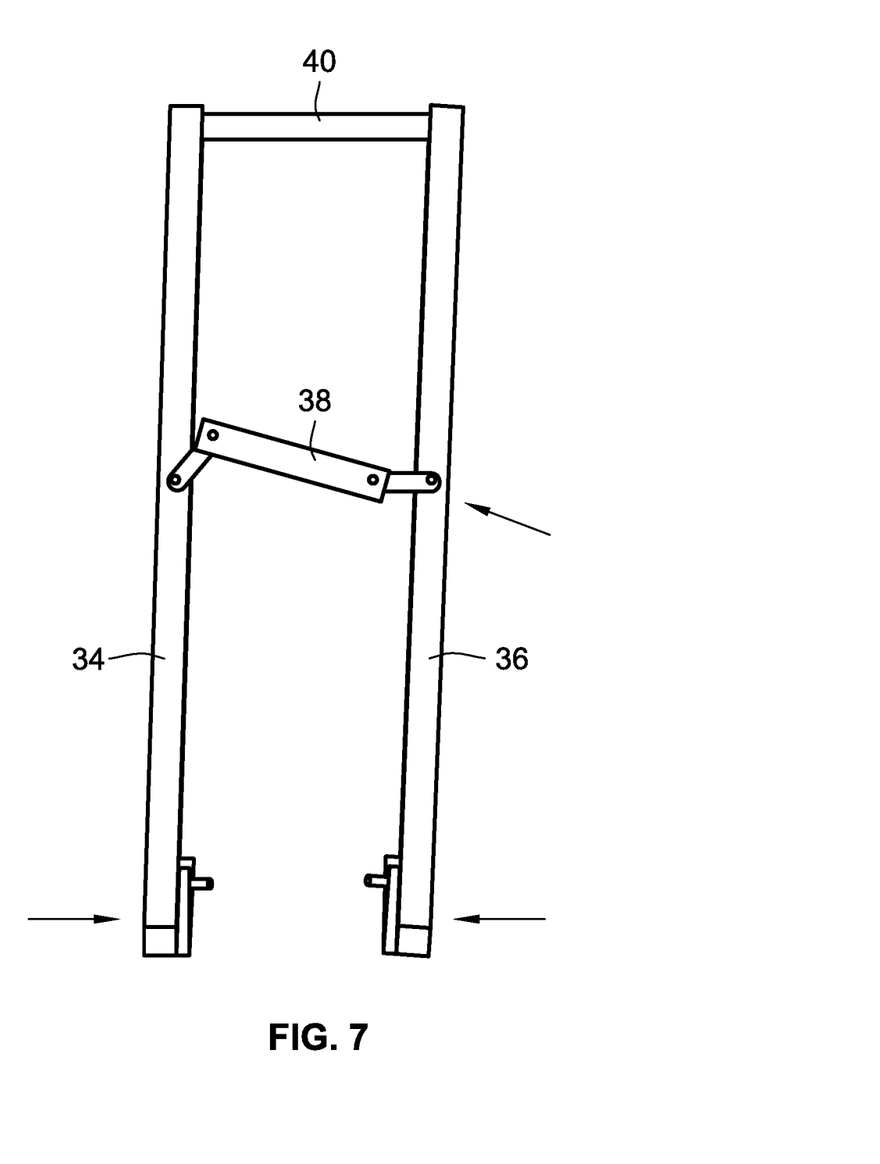

FIG. 7 shows the handle 24 in a contracted state with the hinged beam 38 in an unlocked, open configuration. In this configuration, lower portions of the bars 34, 36 are moved closer to each other, moving the corresponding hook portions 42, 44 closer together than when the hinged member 38 is in the expanded state.

Figure 8:
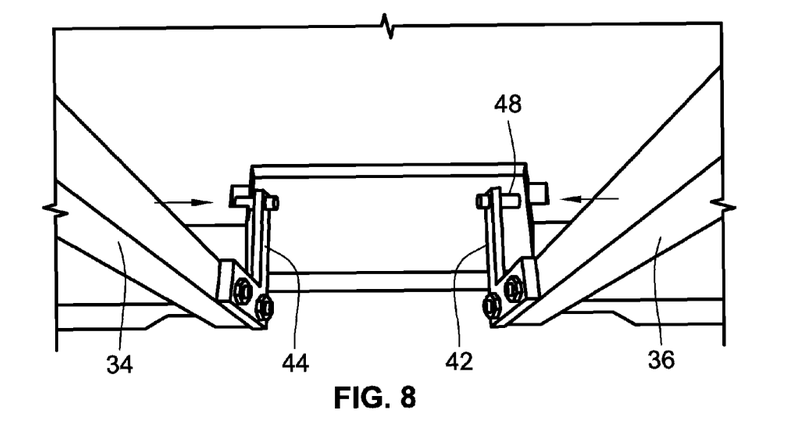
FIG. 8 is a perspective view of a handle in a contracted state positioned for connection to a dolly; and, FIG. 9 is a perspective view of the handle of FIG. 8 in an expanded state locked into the dolly.
Figure 9:
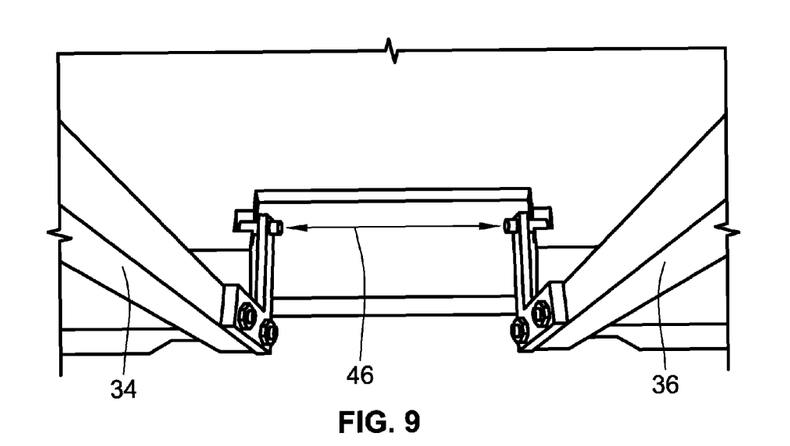

As generally illustrated in FIGS. 8 and 9, when the hinged member 38 is open, the contracted first and second bars 34, 36 and corresponding hook portions 42, 44 are in a first spaced relationship and can be inserted laterally into an opening 46 in the dolly 22 (e.g., FIG. 8). The hinged member 38 can then be closed, this forces the lower portions of the first and second bars 34, 36 to move away from each other into a second spaced relationship and lock the hook portions 42, 44 into place in the dolly 22. Locking pins 48 or other similar structure, either on the hook portions 42, 44 and/or the dolly are utilized to lock the hook portions 42, 44 in place.

The handle 24 is similarly removed by unlocking the hinged beam 38 and contracting the lower portion of the handle 24 to disengage the hook portions 42, 44. The hook portions 42, 44 are then laterally moved from the opening 46 in the dolly 22 to disengage the handle 24.

In an alternative embodiment, the hinged middle beam 38 can be positioned closer to the bottom of the handle 24. In further embodiments, the hook portions can be configured for lateral movement with respect to each other, and the remaining handle portion can be solid or rigid. In addition to a hinged beam, other structures, such as a biasing mechanism (e.g., a spring activated structure) can be utilized to allow the lower portion of the handle to expand and contract as necessary to allow for lateral insertion of the hook portions 42, 44 of the handle into the opening in the side of the platform.

Many modifications and variations of the present invention are possible in light of the above teachings. It is, therefore, to be understood within the scope of the appended claims the invention may be protected otherwise than as specifically described.

We claim:

1. A transport structure with a removable handle comprising:

a platform having a generally planar upper surface for supporting loads having a first side, an opposed second side, a first end and an opposed second end, and a plurality of wheels connected to a lower surface, the platform having a central opening on the first end of the platform, the central opening spaced from the first side and spaced from the second side; and, a handle having a first hook portion and a second hook portion for connecting the handle to the platform through the opening, the first hook portion and second hook portion moveable from a first contracted position to a second expanded position.

2. The transport structure of claim 1 wherein the platform is part of a dolly.

3. The transport structure of claim 1 wherein the platform is part of a cart.

4. The transport structure of claim 1 wherein the handle includes a first bar connected to the first hook portion and a second bar connected to the second hook portion.

5. The transport structure of claim 4 wherein the handle includes a hinged middle beam connecting a middle portion of the first bar to a middle portion of the second bar.

6. The transport structure of claim 5 wherein the handle includes a hand clasp portion connecting a top portion of the first bar to a top portion of the second bar.

7. The transport structure of claim 1 wherein the handle is formed from metal.

8. The transport structure of claim 1 wherein the platform is a molded plastic.

9. The transport structure of claim 1 wherein the first hook portion includes a first locking pin configured to engage a first side of the opening and the second hook portion includes a second locking pin configured to engage a second side of the opening.

10. The transport structure of claim 1 wherein the opening includes a first locking pin configured to engage the first hook portion and a second locking pin configured to engage the second hook portion.

11. The transport structure of claim 1 wherein the first hook portion is separated from the second hook portion by a biasing mechanism.

12. The transport structure of claim 11 wherein the biasing mechanism includes a spring.

13. A dolly comprising:
a generally rectangular platform having an upper support surface, the platform having a first side, a second side opposing the first side, a first end and a second end opposing the first end, and a plurality of wheels connected to a lower portion of the platform;
a handle structure connected to a central opening in the first end of the platform spaced from the first side and spaced from the second side, the handle structure having a first hook portion for connecting to the platform and a second hook portion for connecting to the platform, the first hook portion moveable from a first position spaced from the second hook portion a first distance, to a second position spaced from the second hook portion a second distance greater than the first distance.

14. The dolly of claim 13 wherein the platform includes an opening along the first side for receiving the first hook portion and the second hook portion.

15. The dolly of claim 13 wherein the handle structure includes a first bar connected to the first hook portion and a second bar connected to the second hook portion.

16. The dolly of claim 15 wherein the handle structure includes a hinged beam connected to the first bar and the second bar.

17. The dolly of claim 16 wherein the hinged beam is connected to a middle portion of the first bar and the second bar.

18. The dolly of claim 15 the handle structure includes a biasing mechanism connected to the first bar and the second bar.

19. The dolly of claim 13 wherein the handle structure includes a hand clasp portion at an end distal from the first hook portion and the second hook portion.

20. The dolly of claim 13 wherein the platform is a molded plastic.

* * * * *